United States Patent
Cheng et al.

(10) Patent No.: US 8,959,022 B2
(45) Date of Patent: Feb. 17, 2015

(54) SYSTEM FOR MEDIA CORRELATION BASED ON LATENT EVIDENCES OF AUDIO

(71) Applicant: Motorola Solutions, Inc., Schaumburg, IL (US)

(72) Inventors: Yang M. Cheng, Inverness, IL (US); Dusan Macho, Arlington Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 148 days.

(21) Appl. No.: 13/680,502

(22) Filed: Nov. 19, 2012

(65) Prior Publication Data

US 2014/0009682 A1 Jan. 9, 2014

Related U.S. Application Data

(60) Provisional application No. 61/667,519, filed on Jul. 3, 2012.

(51) Int. Cl.
*G10L 21/00* (2013.01)
*H04N 5/14* (2006.01)

(52) U.S. Cl.
CPC .................................... *H04N 5/14* (2013.01)
USPC ............. 704/270; 707/728; 707/725; 705/58; 704/258; 704/256.2; 704/251; 704/246; 382/201; 382/199; 382/118; 382/100; 375/240.25

(58) Field of Classification Search
CPC ........... G06F 17/30; G06F 17/00; G06F 7/00; G10L 13/00; G10L 15/04
USPC ....................... 704/270, 258, 256.2, 251, 246; 707/728, 725; 705/58; 382/201, 199, 382/118, 100; 375/240.25
See application file for complete search history.

(56) References Cited

U.S. PATENT DOCUMENTS 5,903,892 A * 5/1999 Hoffert et al. .......................... 1/1
6,829,368 B2 * 12/2004 Meyer et al. .................. 382/100
6,925,197 B2   8/2005 Dimitrova et al.
7,289,643 B2 * 10/2007 Brunk et al. .................. 382/100

(Continued)

OTHER PUBLICATIONS

Woojay Jeon, et al. "Efficient Speaker Search Over Large Populations Using Kernelized Locality-Sensitive Hashing", 2010; 4 Pages.

(Continued)

*Primary Examiner* — Michael Colucci
(74) *Attorney, Agent, or Firm* — Kenneth A. Haas

(57) ABSTRACT

A method for determining a relatedness between a query video and a database video is provided. A processor extracts an audio stream from the query video to produce a query audio stream, extracts an audio stream from the database video to produce a database audio stream, produces a first-sized snippet from the query audio stream, and produces a first-sized snippet from the database audio stream. An estimation is made of a first most probable sequence of latent evidence probability vectors generating the first-sized audio snippet of the query audio stream. An estimation is made of a second most probable sequence of latent evidence probability vectors generating the first-sized audio snippet of the database audio stream. A similarity is measured between the first sequence and the second sequence producing a score of relatedness between the two snippets. Finally a relatedness is determined between the query video and a database video.

6 Claims, 6 Drawing Sheets

(56) References Cited

U.S. PATENT DOCUMENTS

| | | | |
|---|---|---|---|
| 7,333,957 B2* | 2/2008 | Levy et al. | 705/58 |
| 7,822,605 B2 | 10/2010 | Zigel et al. | |
| 7,999,847 B2 | 8/2011 | Donovan et al. | |
| 8,077,912 B2 | 12/2011 | Hannigan et al. | |
| 8,090,579 B2 | 1/2012 | Debusk et al. | |
| 8,126,200 B2* | 2/2012 | Rhoads | 382/100 |
| 8,135,221 B2 | 3/2012 | Jiang et al. | |
| 8,335,786 B2* | 12/2012 | Pereira et al. | 707/728 |
| 8,442,823 B2* | 5/2013 | Jeon et al. | 704/246 |
| 8,538,164 B2* | 9/2013 | Zitnick, III | 382/199 |
| 8,705,870 B2* | 4/2014 | Wang et al. | 382/201 |
| 2002/0029144 A1 | 3/2002 | Huang et al. | |
| 2003/0182118 A1* | 9/2003 | Obrador et al. | 704/246 |
| 2003/0212556 A1* | 11/2003 | Nefian | 704/256 |
| 2004/0078188 A1 | 4/2004 | Gibbon et al. | |
| 2004/0120554 A1* | 6/2004 | Lin et al. | 382/118 |
| 2006/0241916 A1 | 10/2006 | Sieracki | |
| 2007/0050406 A1* | 3/2007 | Byers | 707/104.1 |
| 2007/0106693 A1* | 5/2007 | Houh et al. | 707/104.1 |
| 2007/0255565 A1* | 11/2007 | Yu et al. | 704/251 |
| 2008/0046406 A1* | 2/2008 | Seide et al. | 707/3 |
| 2010/0150395 A1 | 6/2010 | Davis et al. | |
| 2010/0205174 A1* | 8/2010 | Jiang et al. | 707/725 |
| 2011/0293018 A1* | 12/2011 | Deever | 375/240.25 |
| 2012/0095764 A1* | 4/2012 | Jeon et al. | 704/246 |
| 2013/0166303 A1* | 6/2013 | Chang et al. | 704/258 |

OTHER PUBLICATIONS

Brian Kulis, et al. "Kernelized Locality-Sensitive Hashing for Scalable Image Search", Proceedings of the IEEE International Conference on Computer Vision (ICCV), Oct. 2009, 8 Pages.

Keansub Lee, et al. "Audio-Based Semantic Concept Classifiction for Consumer Video", 2010 IEEE; 11 Pages.

Huamin Feng, et al. "An Audio Classification and Speech Recognition System for Video Content Analysis", National Natural Science Foundation/Grant 60972139; 2011 IEEE, 5 Pages.

* cited by examiner

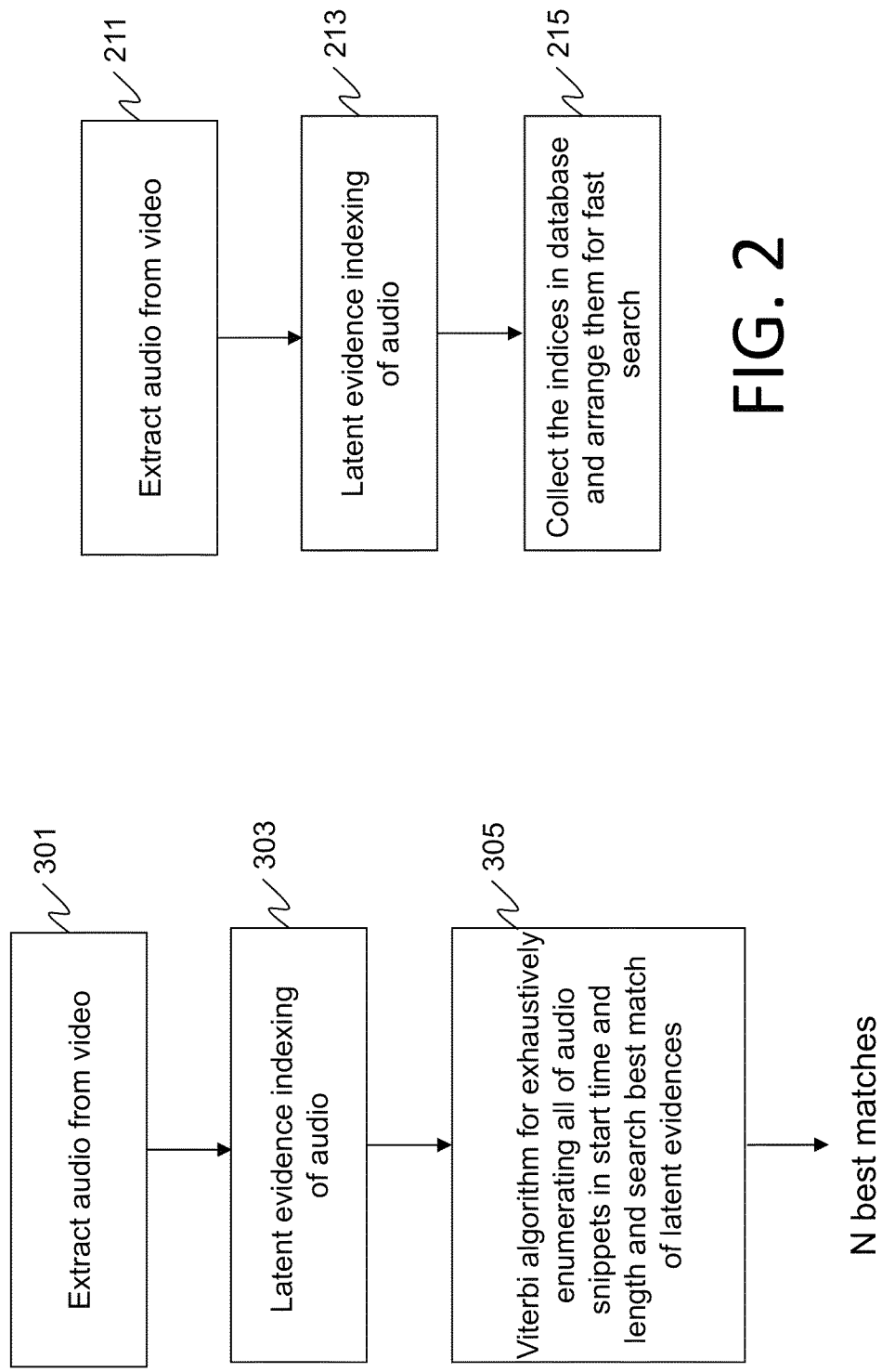

US 8,959,022 B2

SYSTEM FOR MEDIA CORRELATION BASED ON LATENT EVIDENCES OF AUDIO

FIELD OF THE INVENTION

The present invention generally relates to audio correlation, and more particularly to audio correlation between multiple audio files of a database or multiple distributed databases.

BACKGROUND OF THE INVENTION

In public safety investigation when an investigator is reviewing a multimedia file or stream of interest, he/she desires to be supported immediately by alternative evidences from other multimedia files or streams, which were recorded the same time and location and which present additional views or information. In other words, investigators like to be supported in timely manner with "related" multimedia within the database of their agencies as well as with data from external Internet or social networking sites.

Two multimedia files may be related to each other, if snippets of one multimedia file are related to snippets of another, even though they are not entirely identical. (A snippet is defined as a fragment of a multimedia/audio file of a finite length). In discovering related snippets, the first challenge is to discover the audio snippets per pair of multimedia files in a database in an optimal way. Given an audio snippet, there exist many algorithms to find duplicates of the audio snippet within a larger media file or multiple media files; however most of these systems attempt to find an exact match of the audio snippet. In a database, multimedia files may be recorded with different type of cameras, e.g., surveillance camera, smart phone, handhold video recorder, etc. Each camera may record an event of interest with different background noises, so a snippet of interest may not exactly match among recordings. Additionally, because recording devices may be located in different places, different attenuations and audio path characteristics may exist among each camera's recordings of the event of interest.

It would be beneficial to have a system for automatically and quickly identifying an audio snippet in a known media file, which is related to an audio snippet of a media file in a database in order to correlate the known media file to the media file in a database. Such a system must take into account the different environments in which the event of interest was recorded.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 is a flow chart showing the process of indexing, or storing audio.

FIG. 3 is a flow chart showing the process of searching indexed audio.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need a method and apparatus to provide audio correlation between multiple audio files is provided herein. During operation, a processor extracts an audio stream from the query video to produce a query audio stream, extracts an audio stream from the database video to produce a database audio stream, produces a first-sized snippet from the query audio stream, and produces a first-sized snippet from the database audio stream. An estimation is made of a first most probable sequence of latent evidence probability vectors generating the first-sized audio snippet of the query audio stream. An estimation is made of a second most probable sequence of latent evidence probability vectors generating the first-sized audio snippet of the database audio stream. A similarity is measured between the first sequence and the second sequence producing a score of relatedness between the two snippets. Finally a relatedness is determined between the query video and a database video.

The above-technique produces a very fast search especially when the database size is very large.

Figure 1:
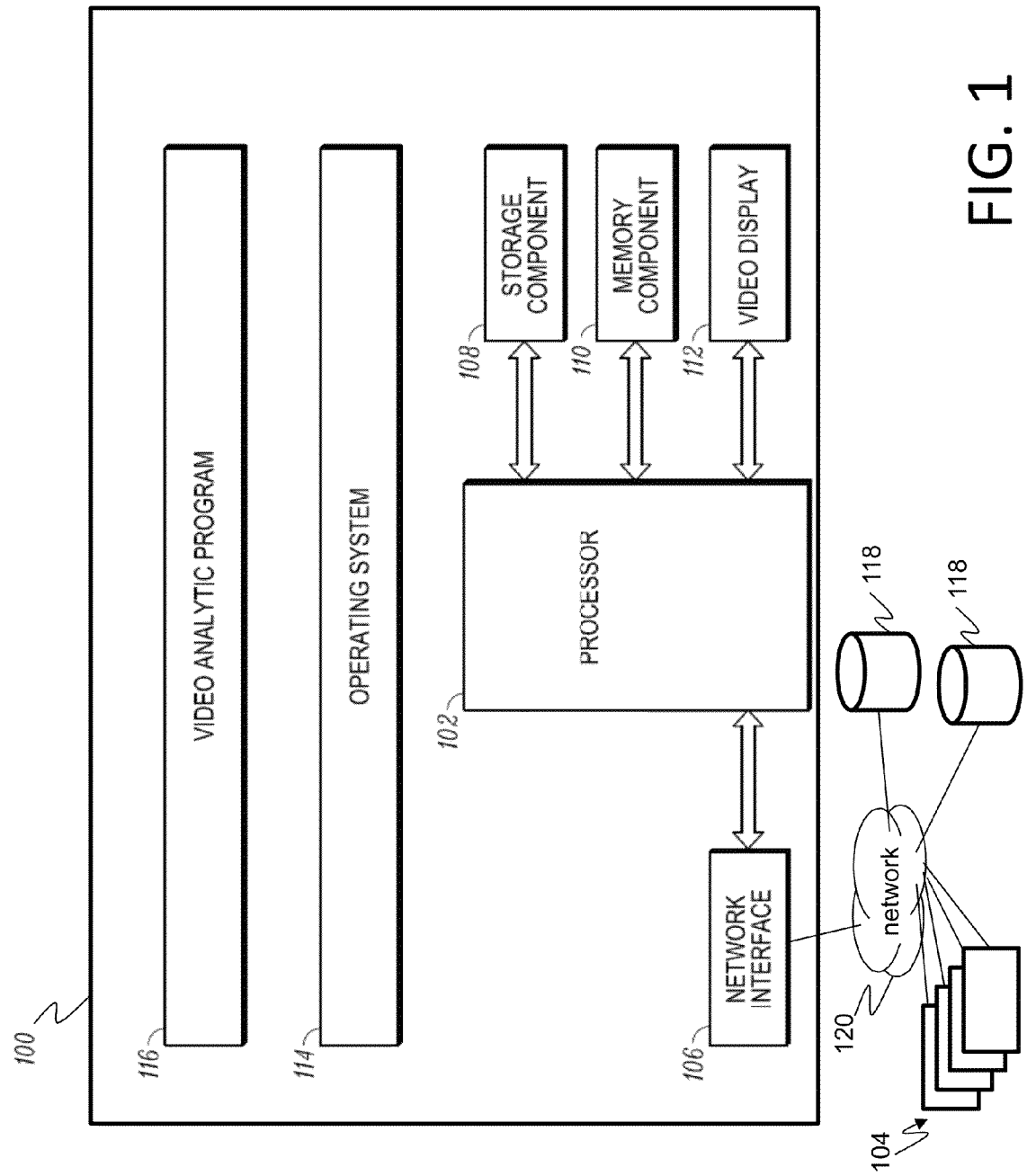
FIG. 1 is block diagram illustrating a general operational environment, according to one embodiment of the present invention.

FIG. 1 is block diagram illustrating a general operational environment, according to one embodiment of the present invention. In general, as used herein, the video analytic device 100 being "configured" or "adapted" means that the device 100 is implemented using one or more components (such as memory components, network interfaces, and central processing units) that are operatively coupled, and which, when programmed, form the means for these system elements to implement their desired functionality, for example, as illustrated by reference to the methods shown in FIG. 2 through FIG. 7. The video analytic device 100 comprises a processor 102 that is communicatively coupled with various system components, including cameras 104, a network interface 106, a storage component 108, a memory component 110, external databases 118 and a video display 112, among others (not shown). The video analytic device 100 further comprises an operating system 114 and a video analytic program 116. Only a limited number of system elements 102-118 are shown for ease of illustration; but additional such elements may be included in the video analytic device 100.

The processing device 102 may be partially implemented in hardware and, thereby, programmed with software or firmware logic or code (e.g., the video analytic program 116) for performing functionality described by reference to FIG. 2 through FIG. 7; and/or the processing device 102 may be completely implemented in hardware, for example, as a state machine or ASIC (application specific integrated circuit). The storage 108 and memory 110 components can include short-term and/or long-term storage of various information needed for the functioning of the respective elements. The storage 108 and memory 110 may further store software or firmware (e.g., the video analytic program 116) for programming the processing device 102 with the logic or code needed to perform its functionality.

In the illustrative embodiment, cameras 104 are attached (i.e., connected) to the video analytic device 100 through network interface 106 and communicates with the processor 102. However, in alternate embodiments of the present invention at least one camera may, for example, be coupled to the video analytic device 100 using a Universal Serial Bus (USB) connection interface (not shown); or integral to and sharing a same physical platform with the video analytic device 100. For example, ten cameras may be deployed at various locations at a workplace, and all ten cameras may be attached to network 120 as the video analytic device 100. In such a case, the video analytic device 100 receives, and stores video frames of video from each of the ten cameras using the network interface 106 and storage component 108.

Where cameras are connected wirelessly to the network interface 106, network interface 106 includes elements including processing, modulating, and transceiver elements that are operable in accordance with any one or more standard or proprietary wireless interfaces, wherein some of the functionality of the processing, modulating, and transceiver elements may be performed by means of the processing device 102 through programmed logic such as software applications or firmware stored on the storage component 108 (standard random access memory) or through hardware. Examples of network interfaces (wired or wireless) include Ethernet, T1, USB interfaces, IEEE 802.11b, IEEE 802.11g, etc.

A camera (also interchangeably referred to herein as video camera or digital video camera) electronically captures a sequence of video frames (i.e., still images) with audio in digital format. The video frames or still images are also commonly known as video frames of video or video frames.

Video analytic program 116 runs on top of the operating system 114 (e.g., Windows 7 or Linux) and is stored in the storage component 108. When the video analytic program 116 is requested by the operating system 114 to be launched, it is loaded into the memory component 110 and executed therein by the processor 102. The processing device 102 uses the video analytic program 116 to analyze video frames of video, and use Viterbi algorithm and Kernalized Locality-Sensitive Hashing to determine whether two videos are related and, furthermore, to support public safety investigators in mid- and post-incident with alternative evidences.

More particularly, storage component 108 continuously stores video and audio from cameras 104. In addition to storage component 108, related video/audio may be stored elsewhere in databases 118. For example, cameras 104 may be part of a video surveillance system that happens to capture a gunshot on at least one of its cameras. Perhaps the gunshot took place in a crowded venue where others may have recorded the incident. Without even knowing that they have recorded evidence, others may post their video to external databases for viewing, for example, YouTube™. Processor 102 will produce an audio stream of a query video clip and access internal storage component 108 as well as external databases 118 and use Viterbi algorithm and Kernalized Locality-Sensitive Hashing to determine whether the query video clip is related to a video clip in a database or databases.

Technically, calculating the defined "relatedness" is algorithmically and computationally intensive given that the databases searched could be extended to Internet. First of all, locating audio snippets of variable lengths for a pair of query multimedia file and any multimedia file in database, which distinctively qualify as "similar" is computationally very intensive. Secondly, the sounds from the same origin recorded at different direction and distance are not identical. The sounds may have been "transformed" as they are modified and decayed by acoustic obstacles along the sound propagation path from the sound origin to the recording device. This process of transformation can be modeled as a generative process of original sounds. The generative process is unknown and variable recording-by-recording.

To consider whether two potential audio snippets are related, all possible generative process parameters have to be hypothesized and evaluated in order to give an optimal measure of their relatedness. Thirdly, the value of media correlation technology is its ability to discover alternative evidences in a large database. However, a large database, such as Internet size, presents the computational challenge in calculating the "relatedness" and searching relevant candidates. Prior-art searching techniques based on the distance between the sound in question and the sound in a database will quickly exceed the limit of modern computers.

In order to address these issues, video analytic program 116 is provided. Video analytic program 116 is illustrated herein as a software application program that physically resides and runs in the single video analytic device 100 and is used to access large databases and calculate a "relatedness" between videos. Alternatively, the video analytic program 116 runs over more than one video analytic device in a manner of distributed computing. One or more layers of software programs may exist between the video analytic program 116 and the operating system 114. For example, the video analytic program 116 may be implemented in C# computer language and runs in a .NET Framework environment (not shown), and the .NET Framework environment exists as a layer between the video analytic program 116 and the operating system 114. In another illustrative embodiment, the video analytic program 116 is implemented in firmware or hardware.

We now turn to a detailed description of the methods performed by the video analytic device 100 (by being programmed with the video analytic program 116) in accordance with the teachings herein and by reference to the remaining figures. FIG. 2 illustrates a logical flow diagram showing a method for indexing audio, the steps of which are performed by processor 102 running video analytic program 116.

At step 211 an audio stream is extracted from a video clip. At step 213 the extracted audio stream is converted to a sequence of latent evidence indices, which most likely generate the audio stream. Latent evidence indices are the numeric representation of original and unmodified typical sound of the length of an audio block, such as human voice phoneme, a music tone, a scream, a gunshot, an explosion, . . . , etc. At step 215 latent evidence indices are entered into a database for future searching. The operation of 211, 213 and 215 are here denoted as video indexing. When executed, a video will be indexed as a series of latent evidence probability vectors that the video can be best represented by a mixture of latent evidences.

FIG. 3 illustrates a logical flow diagram showing a method for video correlation (searching audio), the steps of which are performed by processor 102 running video analytic program 116. At step 301 audio stream is extracted from a first video of interest. At step 303 the audio stream of interest (query audio stream) is converted to a sequence of latent evidence indices, which most likely generate the audio stream. Finally, at step 305, program 116 discovers N audio snippets, each of which most likely relates the video of interest to a video in the database. The operation 301, 303 and 305 are here denoted as video correlation. Thus, after video correlation, N audio snippets of the query video are determined that best match N audio snippets of the database videos.

Figure 4:
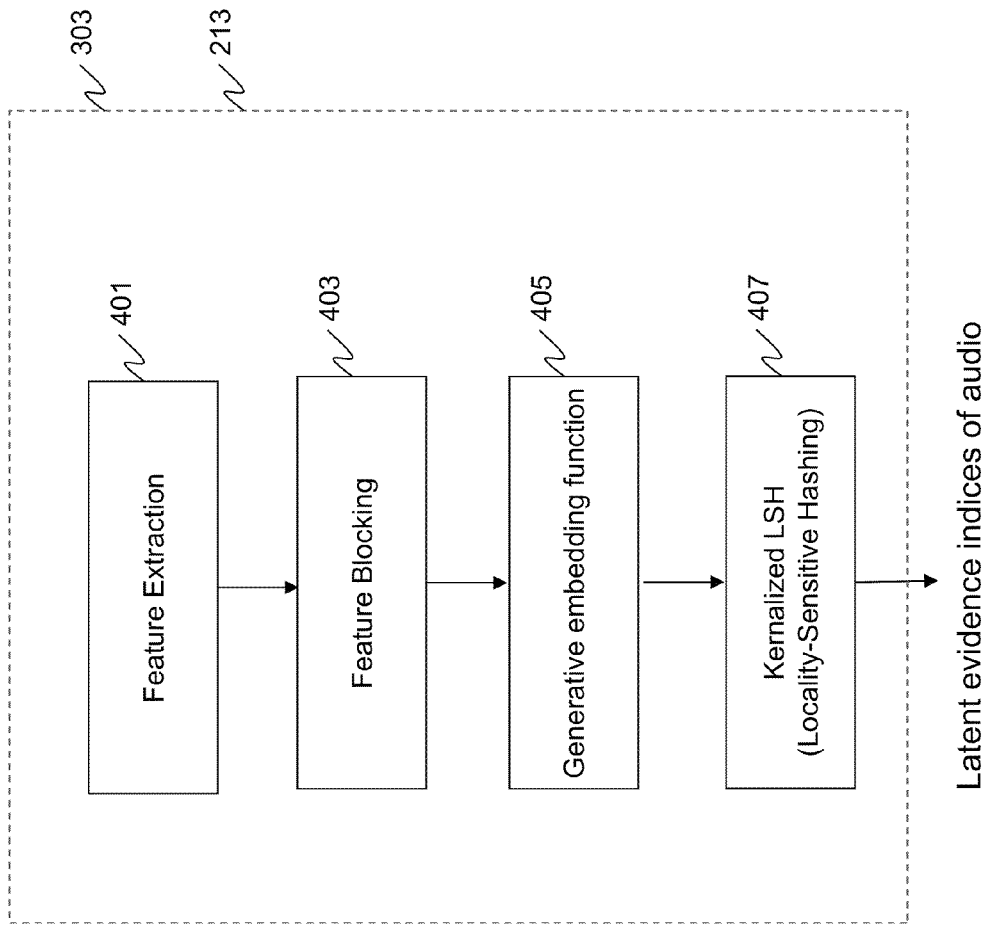
FIG. 4 is a flow chart showing a more-detailed explanation of steps 213 and 303 of FIG. 2 and FIG. 3

FIG. 4 is a flow chart showing a more-detailed explanation of steps 213 and 303 of FIG. 2 and FIG. 3, respectively. As discussed above, these steps take place by processor 102 executing video analytic program 116. Step 401 performs conventional feature extraction, such as determining MFCC (Mel Frequency Cepstral Coefficients), for predetermined periods (e.g., every 10 ms) of audio frame from audio stream. At step 403 a number of consecutive feature vectors are collected to form an audio block of a particular length, for instance, 0.5-1 second. At step 405 processor 102 computes the probabilities of each latent evidence generating the observed audio block provided generative models to form a latent evidence probability vector, which is best representing the audio block. In this embodiment, processor 102 uses a large number of stored basic audio and sound types, such as, initial, middle and tail of a phoneme, an explosive sound, a siren, a scream, etc., as the latent evidences. Thus, at step 405 a probability is determined that the latent evidence of a particular sound type produced the audio block. At step 407 processor 102 uses a conventional Kernalized LSH (Locality Sensitive Hashing) technology to create corresponding latent evidence indices from the probabilities of the latent evidences of each audio block. Kernalized LSH consists of a set of random mappings, which compress a high dimensional vector to a low dimensional integer vector or even a single integer while preserving the neighboring locality in the new space. In this embodiment, two flavors of Kernalized LSH are used. One creates a bitmap vector as index given a high dimensional vector of latent evidence probabilities; another creates an integer as index.

A bitmap vector, which is a vector with single bit as elements, is used for measuring the locality closeness of two audio blocks. This is accomplished via a Viterbi algorithm, for instance, using a Hamming distance measure. An integer is used to arrange the audio block in the video database to quickly identify potential audio blocks from the database. The audio blocks can be arranged in a database based on the value increase of their integer indices. For instance, if the value of the integer index of a query audio block is 87, according to LSH (Locality-Sensitive Hashing) principle, all of audio blocks in a database "similar" to the query audio block should have their integer values near 87. Due to the database arrangement, one only needs searching a small region near 87 to find all of similar audio blocks in the database instead of searching entire database. This scheme produces a very fast search especially when the database size is very large.

Figure 5:
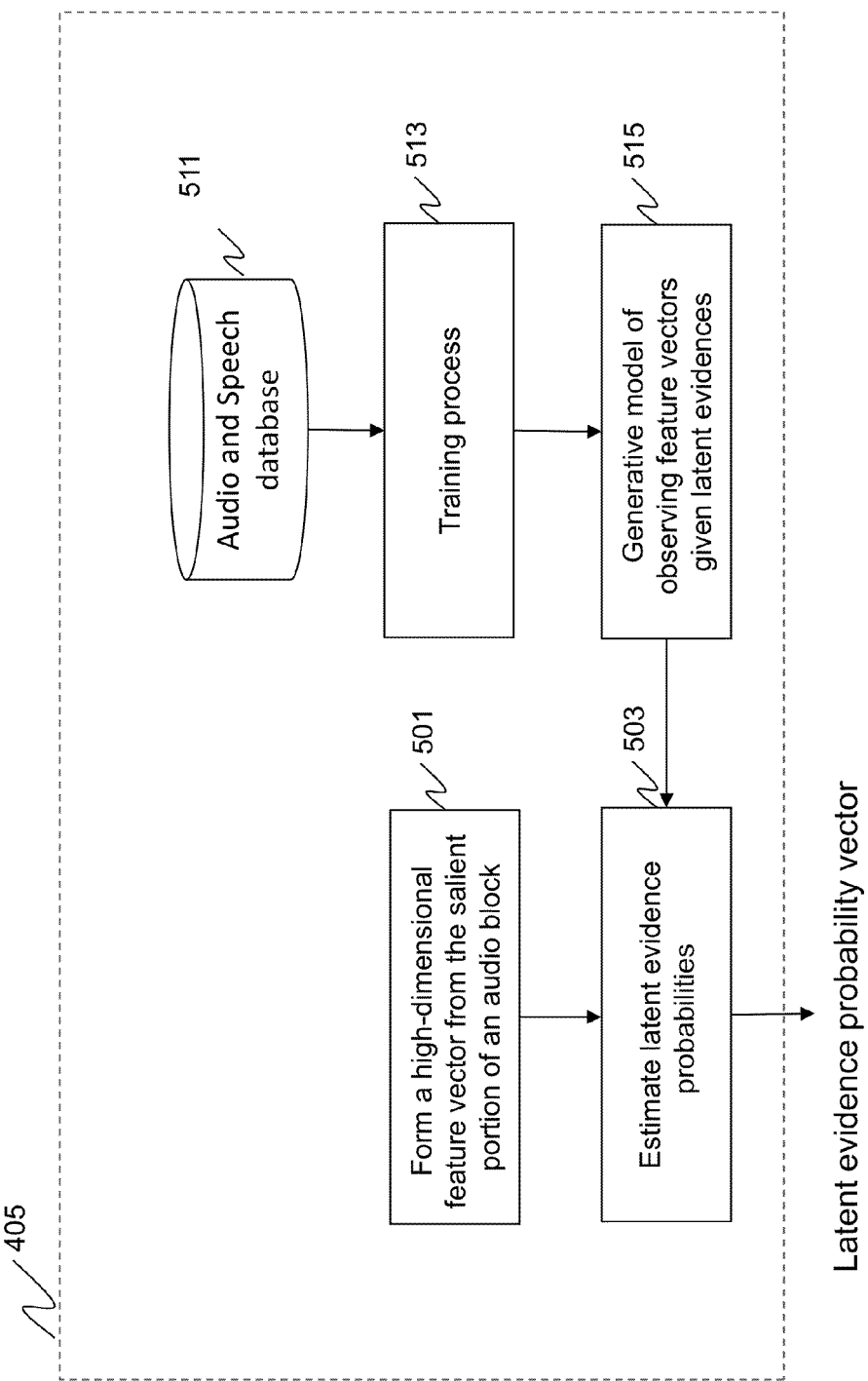
FIG. 5 shows step 405 in further detail.

FIG. 5 shows step 405 in further detail. At step 501 processor 102 identifies a salient portion within an audio block by, for instance, detecting the highest energy region, the fastest change region in spectrogram, etc., within an audio block; then form a high-dimensional feature vector from this region. At step 503 processor 102 estimates the probabilities of each of the latent evidences given the high-dimensional feature vector and provided the generative models (generated at step 515) of generating a feature vector from latent evidences. In this embodiment, a collection of single state HMM (Hidden Markov Model) per an audio or sound type is used as the generative models. An audio or sound type is a latent evidence. In other words, a state of the HMMs is a latent evidence. An audio and speech database 511 (stored in storage component 108) annotated with audio and sound types is utilized by processor 102 at step 513. At step 513 processor 102 uses a generative model training process, for instance, HMMs training process, to create generative models from data. At step 515 processor 102 collects the generative model to support the estimation of the probabilities of the latent evidences.

Further expanding on step 205, a Viterbi algorithm along with Hamming distance to measure closeness of audio indices produced by Kernalized LSH is used in this step that exhaustively enumerates all of possible various size audio snippets of query video (or video of interest) and which identifies a set of most likely related audio snippets from databases. A video clips in a database has a corresponding audio stream, which comprise one or more than one audio snippets most likely related to the query video, are considered as most likely related to the query video. The Viterbi algorithm is listed below. This algorithm discovers N most similar audio stream in the database.

Create an active list with a single audio snippet (special seed) having a length of zero audio blocks and which relates to no audio stream in a database;
for t from 1 to T, where T is query audio stream length in number of audio blocks, and t is a time counter:
    for the query audio block at time t, collect a list of candidate audio blocks from database, which closely match the query audio block using kernalized LSH and fast searching;
    Create an empty "new active" list;
    for each audio snippet in the active list:
        for each audio block in the candidate list:
            if the audio block is able to extent the audio snippet, i.e., the audio block and audio snippet belong to the same audio stream in the database, and the audio block is located at the tail of the audio snippet in the audio stream in the database:
            append the audio block at the tail of the audio snippet with kernalized LSH "closeness" score, and then add the extended audio snippet to the "new active" list.
        if the audio snippet was never extended by any audio block in the candidate list in above loop:
            archive the audio snippet
    for each audio block in the candidate list:
        Add the audio block into the "new active" list as an audio snippet of length of one;
    delete the entire active list
    rename the "new active" list as the active list
archive remaining audio snippets in the active list;
sort the archived audio snippets according to their likelihood value per audio block; and
select top N audio snippets as the best matches.

Figure 6:
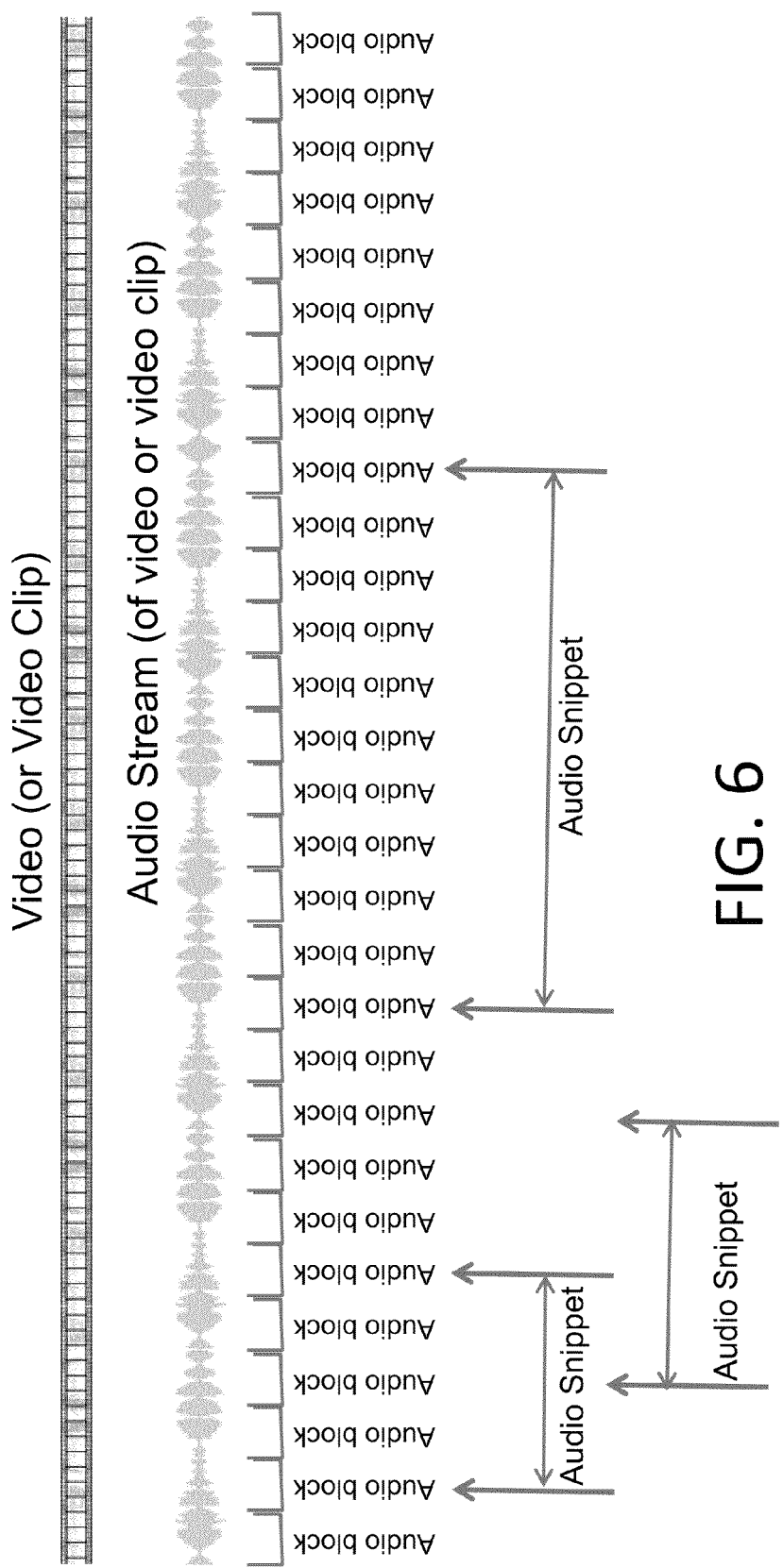
FIG. 6 shows the relationship between a video, an audio stream, audio blocks, and audio snippets

FIG. 6 shows the relationship between a video, an audio stream, audio blocks, and audio snippets as discussed above. As is shown, an audio stream comprises only audio taken from a video clip. Audio blocks are all of a same length, and comprise a portion of the audio stream. An audio snippet comprises multiple audio blocks, and vary in size and starting time. As shown, snippets may overlap in time such that a first snippet may contain a same portion of audio as a second snippet.

Figure 7:
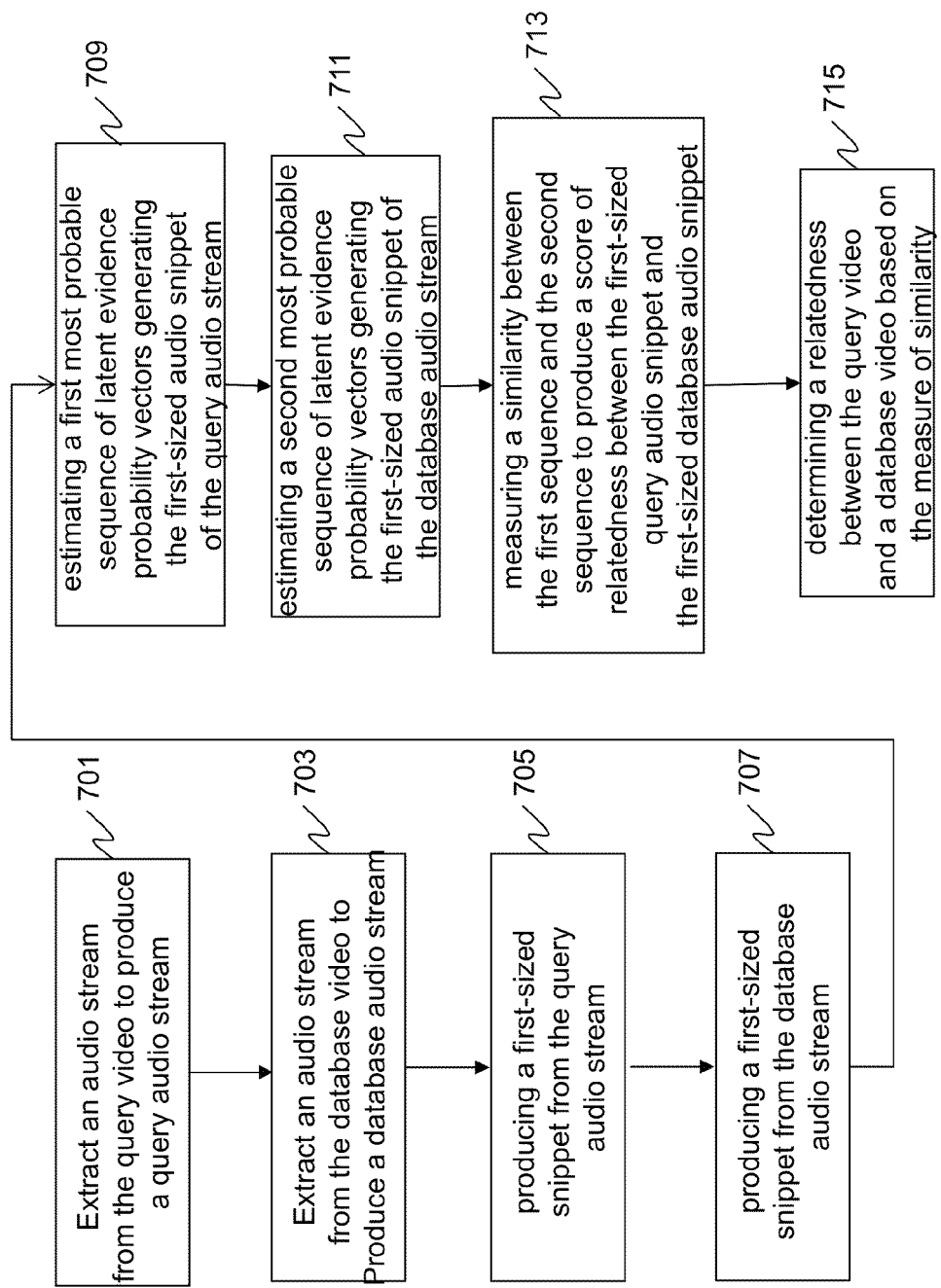
FIG. 7 is a flow chart showing operation of the video analytic device of FIG. 1.

FIG. 7 is a flow chart showing operation of processor 102. More particularly, the logic flow of FIG. 7 shows a method for determining a relatedness between a query video and a database video. The logic flow begins at step 701 where the audio stream is extracted from the query video to produce a query audio stream. At step 703 the audio stream is extracted from the video in the database to produce a database audio stream.

A first-sized snippet is produced at step 705 from the query audio stream and at step 707 a first-sized snippet is produced from the database audio stream.

At step 709 a first most probable sequence is estimated of latent evidence probability vectors generating the first-sized audio snippet of the query audio stream. As discussed above, the latent evidences comprise such things as a voice, music, gunshot, explosion, scream, . . . , etc. Thus, at step 709 a most probable sequence is estimated of latent evidence probability vectors producing the first-sized audio snippet of the query audio.

In a similar manner to step 709, at step 711 a most probable sequence is estimated (second sequence) of latent evidence probability vectors generating the first-sized audio snippet of the database audio stream. Thus, at step 711 a sequence is estimated of latent evidence probability vectors producing the first-sized audio snippet of the database audio.

At step 713 a similarity is measured between the first sequence and the second sequence to produce a score of relatedness between the first-sized query audio snippet and the first-sized database audio snippet. Finally, at step 715, a relatedness between the query video and the database video stream is determined based on the measure of similarity.

Even though the above logic flow in FIG. 7 had a single snippet of a first size being used to generate the relatedness between the query audio stream and the database audio stream, in alternate embodiments of the present invention the above logic flow is repeated for many snippets of many different sizes. For example a second-sized snippet may be produced from the query audio stream, and the second-sized snippet may be produced from the database audio stream. The second-sized snippet may have a second starting time that differs from the starting time of the first snippet. The snippets may overlap. As described above, a first most probable sequence of latent evidence probability vectors generating the second-sized audio snippet may be produced along with a second most probable sequence of latent evidence probability vectors generating the second-sized audio snippet of the database audio stream and a similarity between the first sequence and the second sequence may be used to produce a score of relatedness between the second-sized query audio snippet and the second-sized database audio snippet.

When multiple sized snippets are utilized, the relatedness scores for each sized snippet may be sorted and the N best relatedness scores (e.g., an average of the N best relatedness scores) can be used as a relatedness scores between the query video and the database video.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for determining a relatedness between a query video and a database video, the method comprising the steps of:
   extracting an audio stream from the query video to produce a query audio stream;
   extracting an audio stream from the database video to produce a database audio stream;
   producing a first-sized snippet from the query audio stream;
   producing a first-sized snippet from the database audio stream;
   generating a collection of single state HMM (Hidden Markov Model) for sounds within the snippet from the query audio stream and the snippet from the database audio stream;
   estimating a first most probable sequence of a HMM state probability vectors generating the first-sized audio snippet of the query audio stream;
   estimating a second most probable sequence of HMM state probability vectors generating the first-sized audio snippet of the database audio stream;
   measuring a similarity between the first sequence and the second sequence to produce a score of relatedness between the first-sized query audio snippet and the first-sized database audio snippet, wherein the step of measuring the similarity between the between the first sequence and the second sequence to produce a score of relatedness comprises the step of using a Viterbi algorithm and Kernalized Locality-Sensitive Hashing to determine whether two videos are related; and
   determining a relatedness between the query video and a database video based on the measure of similarity.

2. The method of claim 1 further comprising the steps of:
   producing a second-sized snippet from the query audio stream;
   producing a second-sized snippet from the database audio stream;
   estimating a first most probable sequence of HMM state probability vectors generating the second-sized audio snippet of the query audio stream;
   estimating a second most probable sequence of HMM state probability vectors generating the second-sized audio snippet of the database audio stream; and
   measuring a similarity between the first sequence and the second sequence to produce a score of relatedness between the second-sized query audio snippet and the second-sized database audio snippet.

3. The method of claim 2 further comprising the steps of:
   sorting the relatedness scores; and
   wherein the step of determining the relatedness comprises the step of selecting N best relatedness scores as the relatedness scores between the query video and the database video.

4. The method of claim 2 wherein the step of producing a relatedness score comprises the step of using a Hamming distance to produce the relatedness score.

5. The method of claim 2 wherein second-sized snippet has a starting time that differs from the starting time of the first-sized snippet.

6. The method of claim 5 wherein the second-sized snippet contains a same portion of audio as the first-sized snippet.

* * * * *

UNITED STATES PATENT AND TRADEMARK OFFICE
CERTIFICATE OF CORRECTION

PATENT NO. : 8,959,022 B2  
APPLICATION NO. : 13/680502  
DATED : February 17, 2015  
INVENTOR(S) : Yang M. Cheng et al.

Page 1 of 1

It is certified that error appears in the above-identified patent and that said Letters Patent is hereby corrected as shown below:

IN THE TITLE PAGE:

On Page 2, item (56), under "OTHER PUBLICATIONS," in Column 2, Line 4, delete "Classifiction" and insert -- Classification --, therefor.

On Page 2, item (56), under "OTHER PUBLICATIONS," in Column 2, Line 6, delete "Classifiction" and insert -- Classification --, therefor.

IN THE DRAWINGS:

In FIG. 4, Sheet 3 of 6, for Tag "407", in Line 1, delete "Kernalized" and insert -- Kernelized --, therefor at each occurrence throughout the Patent.

IN THE SPECIFICATION:

In Column 1, Line 58, delete "is" and insert -- is a --, therefor.

In Column 1, Line 66, delete "FIG. 3" and insert -- FIG. 3. --, therefor.

In Column 2, Line 2, delete "snippets" and insert -- snippets. --, therefor.

Signed and Sealed this
Twenty-sixth Day of July, 2016

Michelle K. Lee
*Director of the United States Patent and Trademark Office*